Figure 1:
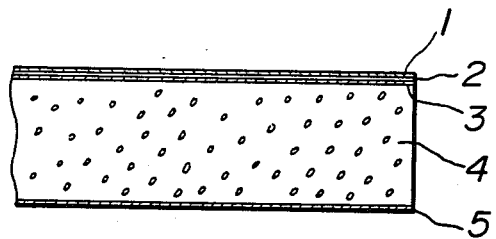

United States Patent [19]

Ohashi et al.

[11] 4,292,361
[45] Sep. 29, 1981

[54] ASBESTOS-METAL SURFACED URETHANE MODIFIED POLYISOCYANURATE FOAM

[75] Inventors: Takashi Ohashi, Iruma; Toru Okuyama, Sagamihara; Akira Suzuki, Hidaka; Katsuhiko Arai, Akigawa, all of Japan

[73] Assignee: Bridgestone Tire Co., Ltd., Tokyo, Japan

[21] Appl. No.: 68,289

[22] Filed: Aug. 20, 1979

[30] Foreign Application Priority Data

Aug. 18, 1978 [JP] Japan .................. 53/100775

[51] Int. Cl.$^3$ .................. B32B 5/20; B32B 15/04
[52] U.S. Cl. .................. 428/215; 428/313; 428/332; 428/422.8; 428/444; 428/920
[58] Field of Search .............. 428/313, 315, 443, 444, 428/422.8, 215, 332, 920; 521/902, 125

[56] References Cited

U.S. PATENT DOCUMENTS

| 2,151,024 | 3/1939 | Gilbert | 428/444 |
|---|---|---|---|
| 3,814,659 | 6/1974 | Nadeau | 428/313 |
| 3,903,346 | 9/1975 | De Leon et al. | 428/322 |
| 3,940,517 | 2/1976 | De Leon | 521/902 |
| 4,067,833 | 1/1978 | Austin et al. | 521/902 |
| 4,073,997 | 2/1978 | Richards et al. | 428/313 |
| 4,118,533 | 10/1978 | Hipchen et al. | 428/313 |
| 4,121,958 | 10/1978 | Koonts | 428/314 |
| 4,131,518 | 12/1978 | Fromson | 428/464 |
| 4,189,541 | 2/1980 | Ohashi et al. | 521/902 |
| 4,205,110 | 5/1980 | Jean | 428/315 |
| 4,212,917 | 7/1980 | Skowronski | 428/310 |

FOREIGN PATENT DOCUMENTS

| 2253890 | 7/1975 | France | 428/313 |
|---|---|---|---|
| 900876 | 7/1962 | United Kingdom | 428/315 |

OTHER PUBLICATIONS

U.K. Patent Application GB No. 2,007,590 A, Published May 23, 1979.

*Primary Examiner*—William J. Van Balen
*Attorney, Agent, or Firm*—Sughrue, Mion, Zinn, Macpeak and Seas

[57] ABSTRACT

A fireproof laminate passing Grade 2 incombustibility according to Japanese Industrial Standard (JIS) A-1321 combustion test is disclosed. The laminate comprises a urethane modified polyisocyanurate foam as a core material and particular surface materials piled on both sides of the foam through self-adhesion of the foam and has a density of the core material of 0.02–0.04 g/cm$^3$ and a total thickness of not more than 30 mm.

16 Claims, 2 Drawing Figures

ASBESTOS-METAL SURFACED URETHANE MODIFIED POLYISOCYANURATE FOAM

This invention relates to novel fireproof laminates using a urethane modified polyisocyanurate foam as a core material. More particularly, it relates to fireproof laminates having excellent fireproof property and low-smoke development, which are obtained by using the above core material having a defined density and an asbestos paper lined with a metal foil as a surface material for at least one side of the core material and piling them one upon another at a total thickness of a defined range through self-adhesion of the urethane modified polyisocyanurate foam.

The fireproof laminates according to the invention are characterized by having a fireproof property passed Grade 2 incombustibility (quasi-incombustible material) in a test for incombustibility of internal finish materials for buildings according to Japanese Industrial Standard (JIS) A-1321.

Recently, demands for weight-saving, easiness of processability, thermal insulating property and the like in building materials are promptly elevated with the high rising and assembling of buildings. Furthermore, flame-proofing regulation for the building materials becomes strengthened with the increase of dangers in the firing. Moreover, the use of quasi-incombustible materials is not only obligated in given sections of detached house, multiple dwelling house and the like by the building regulation, but also abruptly increases in other sections.

As the building materials such as ceiling material, wall material and others, there have hitherto been used ones obtained by using woody part, gypsum or the like as a core material and piling a decorative paper, iron plate or other surface material on a side thereof through an adhesive. However, such building materials are large in the specific gravity and heavy in the weight even in the case of using them as quasi-incombustible material, so that they have such drawbacks that the processability is poor, the thermal insulating property is low, the hygroscopicity is large and the dimensional stability changes considerably with time.

Lately, there have been proposed building materials manufactured by using as a substrate a foamable resin for rigid polyurethane foam, polyisocyanurate foam or the like, which are advantageous in the thermal insulating property and weight-saving, admixing or filling the foamable resin layer with a great amount of a flame retardant, a smoke-suppressing agent, inorganic granules or the like, and laminating the foam as a core material with a relatively thick and heavy steel plate such as colored iron plate and the like as a surface material, a few of which are known as a so-called incombustible building panel. However, it can be said that these panels are unsuitable in the weight-saving and easiness of processability. On the other hand, according to JIS A-1321 "Testing method of incombustibility of internal finish material and procedure of buildings" in the recently revised building regulation, the laminates each composed of the core material and the surface material for use in the ceiling material, wall material and the like are subjected to annexed test and smoke test for toxicity of combustion gases under severe conditions as well as the conventional surface test in order to examine whether or not they pass Grade 2 incombustibility (as quasi-incombustible material). As a result, the extreme restriction for the thickness of the laminate may be required even in the case of using the above mentioned panels in order to pass the laminate through the annexed test. Therefore, these panels can hardly be said to be favorable as the building material having a good thermal insulating property.

Under the above circumstances, the inventors have made various studies with respect to the development of building materials having a light weight, a good thermal insulating property and a fireproof property of Grade 2 incombustibility and as a result, there has previously been proposed a method of producing modified polyisocyanurate foams having a fireproof property of Grade 2 incombustibility (U.S. Pat. No. 4,189,541, Japanese Patent Application Publication No. 35,400/77). However, the modified polyisocyanurate foams obtained by this method themselves are light-weight and has an excellent thermal insulating property, but are insufficient in the appearance, strength and dimensional stability at moisture absorption for direct use in the building material. Now, the inventors have further made various studies with respect to laminates obtained by using the above modified polyisocyanurate foam as a core material, piling a light-weight decorative paper, sheet or film of plastics such as vinyl chloride resin and the like, mineral paper such as asbestos paper and the like, or an aluminum foil as a surface material on the core material through self-adhesion of the modified polyisocyanurate foam. However, when using the decorative paper, plastic sheet or film as the surface material, the resulting laminate is not only unacceptable as the quasi-incombustible material because the fireproof property of the surface material is considerably poor, but also insufficient in the adhesive property between the core material and the surface material, the dimensional stability and the like. On the other hand, when the asbestos paper having a grade of quasi-incombustibility is used as the surface material, if the laminate composed of the foam core and the asbestos paper is subjected to the combustion test, significant cracks are formed in the asbestos paper by the decomposition gases generated from the foam and as a result, the surface of the core material is directly exposed to a fire source to cause phenomena such as increase of fuming quantity, enlargement of lingering flame and the like, so that the grater part of the laminates becomes unacceptable for Grade 2 incombustibility. Further, the asbestos paper is poor in the moisture resistance and flatness, so that the self-adhesion of the core material to the surface material is poor and hence the density of the core material increases with the decrease of fluidity of foam forming composition during the laminating and also the dimensional change at moisture absorption is large and the thermal insulating property is low. Moreover, the deformation of the laminate and the like are caused due to insufficient rigidity of the asbestos paper.

Further, when using the aluminum foil as the surface material, if the thickness of the foil is not less than 0.1 mm, the laminates satisfying the requirements as the building material can be obtained as mentioned by the inventors in Japanese Patent Application No. 135,614/77, but they are not yet satisfactory in the appearance and the like as an internal finish material. If the thickness of the foil is less than 0.1 mm, flame easily passes through the surface material, so that the resulting laminate becomes unacceptable for Grade 2 incombustibility.

With the foregoings in mind, the inventors have made further investigations with respect to the fireproof laminates and as a result, the invention has been accomplished. That is, the invention is to provide novel fireproof laminates useful as the building material, which are light weight and rich in the processability and have an excellent appearance as an internal finish material, a good thermal insulating property and a fireproof property of Grade 2 incombustibility according to JIS A-1321 combustion test.

According to the invention, there is provided a fireproof laminate comprising a urethane modified polyisocyanurate foam as a core material and surface materials piled on both sides of the foam, which comprises:

(a) using an asbestos paper lined with a metal foil having a thickness of less than 0.1 mm as a front surface material for said core material, said asbestos paper being united with said core material through said metal foil by self-adhesion of said foam;

(b) using an aluminum foil having a thickness of not more than 0.1 mm as a back surface material for said core material;

(c) having a density of said core material within a range of 0.02-0.04 g/cm$^3$; and (d) having a total thickness of not more than 30 mm.

Further, according to the invention, there is also provided a fireproof laminate comprising a urethane modified polyisocyanurate foam as a core material and surface materials piled on both sides of the foam, which comprises:

(a) using an asbestos paper lined with a metal foil having a thickness of less than 0.1 mm as a front surface material for said core material, said asbestos paper being united with said core material through said metal foil by self-adhesion of said foam;

(b) lying a matted or woven fiber near the interface between said core material and said front surface material;

(c) using an aluminum foil having a thickness of not more than 0.1 mm as a back surface material for said core material;

(d) having a density of said core material within a range of 0.02-0.04 g/cm$^3$; and (e) having a total thickness of not more than 30 mm.

According to the first and second aspects of the invention, urethane modified polyisocyanurate foams having a low density and an excellent thermal insulating property are used as the core material and the asbestos paper lined with the metal foil of less than 0.1 mm thickness, which is lighter in weight than the steel plate usually used, is used as the front surface material, whereby there can be obtained fireproof laminates useful as the building materials which are very light in weight and have excellent thermal insulating property, processability, appearance and the like. Further, the rigidity of the surface material itself is improved by lining the asbestos paper with the metal foil, so that the resistance to deformation of the surface material is considerably improved. Moreover, by uniting the surface material with the core material through the metal foil, there are solved all of phenomena such as the degradation of adhesive property between the core material and the surface material, which is a serious problem when using only the asbestos paper as the surface material, the increase of the density of the core material accompanied with the decrease of the fluidity of foam forming composition, the dimensional change of the laminate at moisture absorption, the decrease of the thermal insulating property and the like and further combustion characteristics such as smoke development, time of lingering flame and the like according to JIS A-1321 combustion test are considerably improved. The feature that the laminates passing Grade 2 incombustibility (as quasi-incombustible material) are obtained even at the defined total thickness in a range of sufficiently sustaining the thermal insulating property is never anticipated from the prior art and is epoch-making evidently.

In addition, by lying the matted or woven fiber near the interface between the core matierl and the surface material, the occurrence of cracks can be prevented on the asbestos paper and consequently the incombustibility of the laminate surface according to JIS A-1321 combustion test is considerably improved. As a result, there can be provided the laminates having a very high level of Grade 2 incombustibility.

According to the invention, it is essential that the density of the urethane modified polyisocyanurate foam used as the core material is within a range of 0.02-0.04 g/cm$^3$. When the density is less than 0.02 g/cm$^3$, the friability of the core material becomes larger and the self-adhesive property to the surface material, dimensional stability and strength lower, so that the resulting laminates become impossible to be ready for practical use. On the other hand, when the density exceeds 0.04 g/cm$^3$, the fuming quantity increases in the annexed test according to JIS A-1321 combustion test, so that the smoke development of the laminate can not reach to the standard value passing Grade 2 incombustibility.

Further, the laminate according to the invention is essential to have a total thickness of not more than 30 mm. When the total thickness exceeds 30 mm, the increase of fuming quantity, enlargement of lingering flame and the like are caused, whereby the laminate becomes impossible to pass Grade 2 incombustibility according to JIS A-1321 combustion test.

The urethane modified polyisocyanurate foam to be used as the core material is produced by polymerizing and foaming an organic polyisocyanate with a polyol in the presence of a blowing agent, an isocyanate polymerization catalyst and if necessary, a surfactant, a modifying agent and other additives.

The organic polyisocyanate to be used in the invention means an organic compound having two or more isocyanate groups in its molecule and includes aliphatic polyisocyanates, aromatic polyisocyanates, mixtures and modified substances thereof. As the aliphatic polyisocyanate, mention may be made of hexamethylene diisocyanate, isophorone diisocyanate, dicyclohexylmethane diisocyanate, methylcyclohexane diisocyanate and the like. As the aromatic polyisocyanate, mention may be made of tolylene diisocyanate (2,4- and/or 2,6-isomers), diphenylmethane diisocyanate, bitolylene diisocyanate, naphthalene diisocyanate (e.g., 1,5-naphthalene diisocyanate), triphenylmethane triisocyanate, dianisidine diisocyanate, xylylene diisocyanate, tris-(isocyanate phenyl)thiophosphate, polynuclear polyisocyanate having the following formula

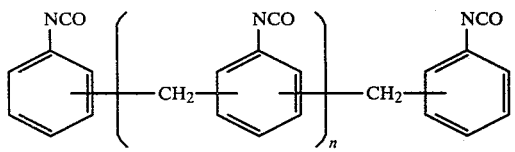

wherein n is 0 or an integer of 1 or more (so-called crude MDI or polymeric isocyanate) obtained by reacting a low polycondensate of aniline and formaldehyde with phosgene, undistilled tolylene diisocyanate and the like. Further, prepolymers having two or more isocyanate groups, which are obtained by any conventional method, for example, prepolymers having an urethane group, a biuret group, an isocyanurate group, a carbodiimide group, an oxazolidone group or the like may be used. These polyisocyanates may be used alone or in admixture of two or more polyisocyanates. As the organic polyisocyanate, the aromatic polyisocyanates, particularly polynuclear aromatic polyisocyanates are preferable in view of flameproofing and thermal insulating property.

The polyols to be used in the invention are compounds each having two or more hydroxyl groups at its terminal, which may be used alone or in admixture of two or more compounds. As the polyol, mention may be made of polyhydric alcohols such as ethylene glycol, propylene glycol, butylene glycol, hexylene glycol, diethylene glycol, dipropylene glycol, glycerin, hexane triol, pentaerythritol, trimethylol propane, methyl glucoside, sorbitol, sucrose and the like and/or addition products with an alkylene oxide thereof; an addition product of a polyamine such as ammonia, ethylene diamine, diethylene triamine, tolylene diamine or the like with an alkylene oxide; a phosphorus containing polyol such as an addition product of phosphoric acid with an alkylene oxide and the like; an addition product of a phenol such as bisphenol A or the like with an alkylene oxide; an addition product of an intermediate having a phenolic hydroxyl group such as novolac resin, resol resin or the like with an alkylene oxide and so on.

The object of the invention can be achieved even by using any molecular weight of the polyol and any equivalent ratio of the polyol to the organic polyisocyanate, but a preferable result can be obtained by defining the molecular weight and equivalent ratio to the following ranges. That is, it is preferable to use the polyol having a hydroxyl equivalent of 30–2000, preferably 50–1000 as the molecular weight and a urethane modifying ratio of 0.05–0.5 equivalent, preferably 0.08–0.3 equivalent per isocyanate group of the organic polyisocyanate to be used in view of the fireproof property and the self-adhesive property to the surface material. When the hydroxyl equivalent is less than 30 as the molecular weight of the polyol, the resulting urethane modified polyisocyanurate foam has a tendency of degrading the friability. On the other hand, when the hydroxyl equivalent exceeds 2000, even if the predetermined urethane modifying ratio is adopted, the amount of the polyol used considerably increases and the flameproofing is apt to be degraded. Similarly, when the urethane modifying ratio of the polyol is outside the above defined range, the friability or flameproofing is apt to be degraded.

In the formation of the core material, there may be used any of well-known isocyanate polymerization catalysts, typical examples of which are as follows:

(1) Tertiary amino compounds, such as dialkylaminoalkyl phenols (e.g., 2,4,6-tris(dimethylaminomethyl)-phenol and so on), triethylamine, N,N',N''-tris(dimethylaminoalkyl)-hexahydrotriazines, tetraalkylalkylene diamines, dimethylethanol amine, diazabicyclooctane or its lower alkyl substituted derivatives and the like;

(2) Combinations of tertiary amines with cocatalysts; As the cocatalyst, mention may be made of ethyl alcohol, mono-substituted carbamic acid, esters, aldehydes, alkylene oxides, alkylene imines, ethylene carbonate, 2,3-butanedione and the like.

(3) Tertiary alkyl phosphines;

(4) Alkali metal salts of imides, such as potassium phthalimide and the like;

(5) Onium compounds, such as quaternary onium hydroxyl compounds of nitrogen, phosphorus, arsenic or antimony, onium hydroxyl compounds of sulfur or selenium and the like;

(6) Alkyl substituted ethyleneimines, such as N-methyl ethyleneimine, phenyl-N,N-ethylene urea and the like;

(7) Metal salts of carboxylic acids, such as potassium acetate, potassium 2-ethyl hexanoate, lead 2-ethyl hexanoate, sodium benzoate, potassium naphthenate, potassium caprylate and the like;

(8) Oxides, hydroxides, carbonates, enolic compounds and phenolic compounds of alkali metals or alkaline earth metals:

(9) Epoxy compounds;

(10) Combinations of epoxy compounds with cocatalysts; As the cocatalyst, mention may be made of tertiary amines, metal salts of aromatic secondary amines such as sodium salt of diphenylamine and the like;

(11) Various metal salts, such as stannous octanoate, titanium tetrabutyrate, tributyl antimony oxide and the like;

(12) Friedel-Crafts catalysts, such as aluminum chloride, boron trifluoride and the like; and

(13) Chelate compounds of alkali metals, such as sodium salicylaldehyde and the like.

These catalysts may be used alone or in an admixture thereof, but the alkali metal salt of carboxylic acids having a carbon number of 2–12 or the combination with the tertiary amino compound thereof is preferably used in view of a catalytic activity, a compatibility with the polyol and the like.

The amount of the isocyanate polymerization catalyst used is preferably 0.5–10% by weight per the organic polyisocyanate in view of the catalytic activity.

According to the invention, all of blowing agents used in the production of conventional polyurethane foams and polyisocyanurate foams may be used. For instance, the blowing agent includes carbon dioxide gas generated by adding water to the reaction mixture or supplied from an external source, nitrogen gas and a mixture thereof. However, the preferred blowing agent is a low-boiling inert solvent evaporating by a heat of reaction in the foaming process. Such a solvent is a fluorinated and/or chlorinated hydrocarbon having a good compatibility, a typical example of which includes trichloromonofluoromethane, dichlorodifluoromethane, dichloromonofluoromethane, monochlorodifluoromethane, dichlorotetrafluoroethane, 1,1,2-trichloro-1,2,2-trifluoroethane, methylene chloride, trichloroethane and the like. Further, benzene, toluene, pentane, hexane and so on may be used. These blowing agents may be used alone or in an admixture thereof. Among them, trichloromonofluoromethane is preferable as the blowing agent in view of the foam properties, easiness of foaming and the like.

The addition amount of the blowing agent should be controlled so as to maintain the density of the urethane modified polyisocyanurate foam as the core material at the defined range of 0.02–0.04 g/cm$^3$. For this end, the blowing agent is used in an amount of about 10–40% by weight per foam forming composition though the amount is somewhat dependent upon the kinds of the organic polyisocyanate and polyol, the urethane modifying ratio of the polyol and the like.

In addition to the above mentioned ingredients, a surfactant, a modifying agent and other additives may be added, if necessary.

As the surfactant, use may be made of any ones usually used in the production of polyurethane foams, an example of which includes an organosilicone surfactant such as organopolysiloxane-polyoxyalkylene copolymer, polyalkenyl siloxane having a side chain of polyoxyalkylene and the like. Further, oxyethylated alkyl phenol, oxyethylated aliphatic alcohol, ethylene-propylene oxide block polymer and so on are effective as the surfactant. The surfactant is usually used in an amount of about 0.01–5 parts by weight per 100 parts by weight of the organic polyisocyanate.

As the other additive, there are inorganic hollow particles, granulated refractory, fibrous materials, inorganic fillers and the like, which are used for improving the foam properties such as hardness and the like. The inorganic filler includes mica powder, finely divided clay, asbestos, calcium carbonate, silica gel, aluminum hydroxide, calcium hydroxide, magnesium hydroxide, gypsum, sodium silicate and the like.

Moreover, a flame retardant may be added without deviating the effect of the invention. According to the invention, the flame retardant usually used in the common polyurethane foam and urethane modified isocyanurate foam is effective and includes, for example, halogenated organic phosphorus compounds such as tris(chloropropyl)phosphate, tris(dichloropropyl)phosphate, tris(dibromopropyl)phosphate and the like; and inorganic flame retardant such as antimony oxide and the like.

According to the invention, it is an essential feature that an asbestos paper lined with a metal foil having a thickness of less than 0.1 mm is used as a front surface material piled on the urethane modified polyisocyanurate foam of the core material in view of an appearance of the resulting laminate and united with the core material through the metal foil.

In case of using the asbestos paper alone as the surface material, the resulting laminate has serious problems in the properties required for use in the building material as mentioned above and further does not pass Grade 2 incombustibility relating to the fireproof property. Moreover, if the front surface material according to the invention is united with the core material through the asbestos paper instead of the metal foil, the resulting laminate is insufficient in the appearance and only exhibits substantially the same properties and fireproof property as in the case of using only the asbestos paper.

As the asbestos paper, use may be made of any ones commercially available in the market. In general, these asbestos papers are obtained by bonding asbestos fibers with a binder such as pulp, starch, synthetic resin and the like and shaping them into a paper by means of a press or the like. Although there are sold various asbestos papers having a thickness of not less than 0.1 mm, according to the invention, it is preferable to use the asbestos paper having a thickness of 0.1–0.5 mm in view of the economic reason and weight-saving.

As the metal foil for the lining of the asbestos paper, use may be made of any commercially available ones such as iron foil, copper foil, aluminum foil, tin foil and the like. In order to provide light-weight building materials, it is preferable to use the metal foil having a thickness of less than 0.1 mm, which is capable of developing a satisfactory fireproof property. Among the above foils, the use of iron and aluminum foils each having a thickness of less than 0.1 mm is preferable in view of weight-saving, economic reason, easiness of processability and the like. The metal foil is lined to the asbestos paper with a small amount of an adhesive. In this case, the amount of the adhesive used is as very small as about 0.002–0.003 mm on a thickness basis, so that it hardly exerts on the fireproof property. As a result, there may be used any kinds of the adhesives including, for example, polyester resins, epoxy resins, urethane resins and the like.

According to the invention, the outer surface of the asbestos paper as the front surface material may further be subjected to various decorations by painting, printing and the like if necessary, so as not to damage the fireproof property, or may be covered with a fabricated article previously painted or printed. Further, in order to improve the adhesive property between the metal foil and the core material, a primer or the like may be used so as not to damage the fireproof property.

In the second aspect of the invention, a matted or woven fiber is lain near the interface between the surface material and the core material. As the fiber, use may be made of organic fibers such as nylon fiber, polyester fiber, victoria lawn and the like; and inorganic fibers such as asbestos fiber, gypsum fiber, Shilas fiber, glass fiber and the like. Among them, it is preferable to use the matted or woven glass fiber or flame retardant victoria lawn. These fibers can develop a satisfactory effect at a thickness of not more than 2 mm. If the thickness is more than 2 mm, it is difficult to penetrate the foam forming composition into the fibers, so that the self-adhesion of the core material to the surface material is degraded. According to the invention, if it is intended to lie the matted or woven fiber near the interface between the core material and the surface material to produce a laminate, the fibers somewhat spread toward the core material during the foaming of the foam forming composition, so that the thickness of the fiber layer in the laminate becomes slightly larger than the original thickness of the fiber layer.

The back surface material to be used in the invention is preferably an aluminum foil having a thickness of not more than 0.1 mm in view of the economic reason and easiness of processability. When the thickness of the foil is more than 0.1 mm, the degradation of the fireproof property becomes appeared, which will be guessed from the following fact. That is, when the thickness of the foil exceeds the upper limit, the rigidity of the back surface material becomes higher, so that when the front surface material is exposed to a flame, the decomposition gases generated from the core material can not expand toward the back surface material and hence expands toward the front surface material, whereby the front surface material is broken. Moreover, when the back surface material is not used in the manufacture of the laminate according to the invention, the dimensional stability at moisture absorption and the thermal conductivity lower and as a result, the properties of the resulting laminate as the building material are degraded. Therefore, it is necessary to use aluminum foils having a thickness of not more than 0.1 mm as the back surface material.

The reason why the laminates according to the invention have excellent properties as the building material and develop excellent fireproof property and low-smoke development as Grade 2 incombustibility is guessed as follows.

That is, according to the invention, the moisture absorption of the asbestos paper can completely be shut off by using the asbestos paper lined with the metal foil, so that the dimensional change at moisture absorption of the core material and the decrease of thermal insulating property can be prevented, while the dimensional change of the core material can also physically be prevented by the rigidity of the metal foil. Further, by uniting the metal foil with the core material, the self-adhesive property of the core material to the surface material is improved considerably. Since the metal foil has a good smoothness, the fluidity of the foam forming composition used for the formation of the core material is improved and also an additional effect of making the density of the core material low is obtained.

Referring to the fireproof property, the laminate having only the asbestos paper as the surface material is unacceptable for Grade 2 incombustibility in the surface test according to JIS A-1321 combustion test because conspicuous cracks are formed in the asbestos paper by the decomposition gases generated from the core material and hence the surface of the core material is directly exposed to the flame to cause phenomena such as the increase of fuming quantity, enlargement of lingering flame and the like as previously mentioned. On the contrary, the laminates according to the invention are manufactured by using the asbestos paper lined with the metal foil as the front surface material and uniting it with the core material through the metal foil, so that they are acceptable for Grade 2 incombustibility in the surface test according to JIS A-1321 combustion test because the surface of the core material is covered with the metal foil even if cracks are formed in the asbestos paper and hence the fuming quantity and the lingering flame become less.

Furthermore, when the matted or woven fiber is lain near the interface between the core material and the front surface material, decomposition gases generated from the core material are emanated through the fiber toward exterior in the surface test according to JIS A-1321 combustion test. As a result, the deformation of the front surface material by the decomposition gas is suppressed to develop a remarkable effect of preventing the formation of cracks in the front surface material. Moreover, the surface of the core material is covered with the fiber, so that the dissipation of heat inside the core material is suppressed to exhibit the fireproof property of a higher level. On the contrary, when the matted or woven fiber is disposed along the middle portion of the core material, if the resulting laminate is subjected to the surface test, the above mentioned effects can not be obtained and hence the satisfactory fireproof property is not developed. From this fact, it is obvious that the fiber should be lain near the interface between the core material and the front surface material.

The production of the fireproof laminate according to the invention can be carried out by any well-known processes. For instance, the polyol as a urethane modifying agent, catalyst and blowing agent are mixed with stirring by adding a foam stabilizer and other additives, if necessary, to form a homogeneous solution, to which is added the organic polyisocyanate with stirring, whereby a foam forming composition is obtained. Then, the foam forming composition is foamed in a space defined by two metal plates as a surface material so as to form a laminate of a predetermined thickness and bonded thereto through the self-adhesion of the resulting polyisocyanurate foam. Moreover, the polyisocyanurate foam may be bonded to the surface material with an adhesive without damaging the fireproof property. In the latter case, a great care must be taken in the selection of the adhesive.

The fireproof laminates according to the invention have the following characteristics, which have never been provided by the laminates of the prior art.

(a) The asbestos paper lined with the thin metal foil is used as the front surface material and the urethane modified polyisocyanurate foam having an excellent thermal insulating property is used as the core material, so that there are provided laminates having a light weight, an excellent processability and a very high thermal insulating property.

(b) By uniting the front surface material with the core material through the metal foil, the changes with time such as dimensional change at moisture, decrease of thermal insulating property and the like are considerably improved and further the adhesive property between the core material and the surface material is improved, so that the resulting laminate is sufficiently durable in long use time.

(c) In the combination of the core and surface materials, the density of the core material is limited to a range of 0.02–0.04 g/cm$^3$ and the total thickness of the laminate is restricted to not more than 30 mm, whereby the fireproof property of the laminate passes Grade 2 incombustibility according to JIS A-1321 combustion test.

(d) Since the asbestos paper capable of subjecting to a surface treatment such as printing, painting and the like is used as the front surface material, laminates having a rich design are obtained as the building material.

(e) The cost of the front surface material is fairly cheap as compared with the colored steel plate usually used as the surface material.

(f) The laminate having an excellent fireproof property can be provided by starting from the urethane modified polyisocyanurate foam as the core material without adding additives such as flame retardant, inorganic filler and the like, so that the production of such laminates is advantageous in view of the storage stability of the starting material and the production process.

(g) By lying the matted or woven fiber near the interface between the core material and the surface material, the fireproof property is further improved and also the dimensional stability is improved considerably.

Figure 2:
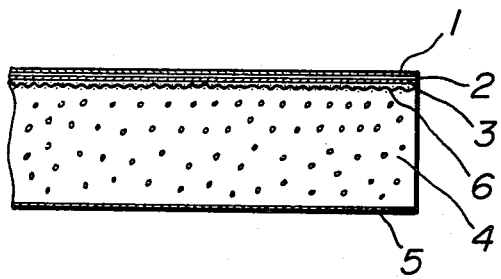

The invention will now be described with reference to the accompanying drawings, wherein:

FIGS. 1 and 2 are fragmentary sectional views of embodiments of the fireproof laminate according to the invention, respectively.

The following examples are given in illustration of the invention with comparative examples and are not intended as limitations thereof. In the examples, all parts and percents are by weight, unless otherwise stated.

Moreover, the effect of the invention is decided on a basis of whether or not the laminate passes Grade 2 incombustibility according to JIS A-1321 combustion test. The surface test according to JIS A-1321 is carried out by placing a test piece with a length, width and thickness of 22 cm×22 cm×15–30 cm in a heating furnace and then heating a surface of the test piece for a predetermined period using gas as a sub-heat source and an electric heater as main heat source. Thereafter, the presence and degree of crack/deformation, time of lingering flame after the completion of heating, heat release value (temperature time area, °C.×min.) calculated from the difference between the exhaust temperature curve of the test piece and the reference curve of perlite plate as a standard material, and fuming factor calculated from maximum fuming quantity are measured to judge the fireproof property of the test piece on a basis of acceptable standard values shown in the following Table 1.

Further, the annexed test of the laminate is carried out under the same conditions as described above, except that three holes of 2.5 cm diameter are pierced from front of the test piece to rear side thereof in place. In this case, the evaluation of the term "crack/deformation" is omitted.

TABLE 1

Test
Acceptable standard values of Grade 2
incombustibility (quasi-incombustible material)
according to JIS A-1321 combustion test

| Class | Heat release value (°C. × min.) | Fuming factor | Time of lingering flame (sec.) | Crack/deformation |
|---|---|---|---|---|
| Surface test | not more than 100 | not more than 60 | not more than 30 | no harmful degree |
| Annexed test | not more than 150 | not more than 60 | not more than 90 | — |

EXAMPLE 1, COMPARATIVE EXAMPLES 1–3

Laminates were manufactured by using urethane modified polyisocyanurate foams made from the compounding recipe of the following Table 2 as a core material.

TABLE 2

| Ingredients | Parts by weight |
|---|---|
| Crude diphenylmethane diisocyanate[1] | 100 |
| Polypropylene glycol[2] | 13.97 |

TABLE 2-continued

| Ingredients | Parts by weight |
|---|---|
| Solution of 20 wt. % potassium acetate in dipropylene glycol[3] | 4.0 |
| N,N',N''-tris(dimethylaminopropyl)-sym-hexahydrotriazine[4] | 0.5 |
| Trichloromonofluoromethane[5] | 28 |
| A urethane modifying ratio for isocyanate group is 0.083. | |

Note:
[1]44 V-20 (trade name) made by Sumitomo Bayer Urethane Co., Ltd.; isocyanate equivalent = 137
[2]PP-2000 (trade name) made by Sanyo Kasei Kogyo Co., Ltd.; hydroxyl equivalent = 1,000
[3]The solution is abbreviated as AcOK/DPG hereinafter.
[4]Polycat 41 (trade name) made by Abbott Laboratories, hereinafter abbreviated as P-41.
[5]The compound is abbreviated as F-11 hereinafter.

The laminate including the urethane modified polyisocyanurate foam as the core material was manufactured as follows.

In an aluminum mold of 40 cm of length and width each was placed a surface material having approximately the same size as that of the mold, and then the mold was heated up to about 38° C. in an oven. Separately, 300 g of the crude diphenylmethane diisocyanate was weighed in a stainless beaker of 0.5 l capacity, while the ingredients other than the above diisocyanate were weighed in a polyethylene beaker of 1 l capacity and thoroughly mixed to form a homogeneous solution. To this solution was added the above diisocyanate and then the resulting mixture was immediately stirred at a high speed for about 6 seconds to obtain a foam forming composition. Then, the composition was cast into the aluminum mold disposing the surface material therein. (In this case, two molds were provided and the composition was sequentially cast into these two molds.) Thereafter, an upper aluminum cover having another surface material at its inner surface was placed on the mold through a spacer of 25 mm thickness and fixed thereto by means of clamp or the like. This assembly was heated in an oven at a temperature of about 50° C. for 15 minutes to effect the curing and then the resulting laminate was taken out from the assembly. In this procedure, there were used surface materials as shown in the following Table 3.

The thus obtained laminate was examined according to JIS A-1321 combustion test to obtain a result relating to the fireproof property of Grade 2 incombustibility as shown in Table 3.

TABLE 3(a)

| | | Comparative Example 1 | | Comparative Example 2 | |
|---|---|---|---|---|---|
| Surface material | Front (thickness) | Aspaal W-3310[1] (0.27 mm) | | Wall paper made from vinyl chloride resin (0.07 mm) + Aspaal #3322[2] (0.12 mm) | |
| | Back (thickness) | Aluminum foil (0.05 mm) | | Aluminum foil (0.05 mm) | |
| JIS-A-1321 combustion test | Class | Surface test | Annexed test | Surface test | Annexed test |
| | Density of core material (g/cm³) | 0.0281 | 0.0287 | 0.0249 | 0.0293 |
| | Heat release value (°C. × min.) | 30 | 65 | 36.25 | 161.25 |
| | Fuming factor | 62 | 72 | 96 | 102 |
| | Time of lingering flame (sec.) | 20 | 15 | 17 | 34 |
| | Crack/deformation | none/middle-large | — | none/middle-large | — |

TABLE 3(a)-continued

|  | Comparative Example 1 | Comparative Example 2 |
|---|---|---|
| Judgement | unacceptable | unacceptable |

Note:
(1),(2) asbestos paper of incombustible grade, made by Jujo Seishi Co., Ltd.
In the column "front surface material" of Table 3, A + B means a surface material obtained by lining B to A with an adhesive so as to face B to the core material. As the adhesive, Viron (trade name, made by Toyobo Co., Ltd., polyester resin) was used in a coating thickness of about 0.002-0.003 mm. In each example as mentioned below, the front surface material means the above.

TABLE 3(b)

|  |  | Comparative Example 3 | | Example 1 | |
|---|---|---|---|---|---|
| Surface material | Front (thickness) | Aluminum foil (0.05 mm) | | Aspaal W-3310 (0.27 mm) + Aluminum foil (0.015 mm) | |
|  | Back (thickness) | Aluminum foil (0.05 mm) | | Aluminum foil (0.05 mm) | |
| JIS-A-1321 combustion test | Class | Surface test | Annexed test | Surface test | Annexed test |
|  | Density of core material (g/cm$^3$) | 0.0298 | 0.0293 | 0.0292 | 0.0299 |
|  | Heat release value (°C. × min.) | 38.75 | 28.75 | 0 | 16.25 |
|  | Fuming factor | 71.7 | 45.0 | 17.1 | 31.5 |
|  | Time of lingering flame (sec.) | 45 | 33 | 0 | 28 |
|  | Crack/deformation | none/small | — | none/small | — |
|  | Judgement | unacceptable | | acceptable | |

In the column "front surface material" of Table 3, A + B means a surface material obtained by lining B to A with an adhesive so as to face B to the core material. As the adhesive, Viron (trade name, made by Toyobo Co.,Ltd., polyester resin) was used in a coating thickness of about 0.002-0.003 mm. In each example as mentioned below, the front surface material means the above.

The fireproof laminate of Example 1 comprises a front surface material obtained by lining an asbestos paper 1 with an aluminum foil 3 through an adhesive layer 2, a core material 4 of a urethane modified polyisocyanurate foam, and a back surface material 5 of an aluminum foil as shown in FIG. 1.

Moreover, the fireproof property of the laminate was evaluated by the surface and annexed tests. As apparent from the data of Table 1, the laminate using the surface material according to the invention becomes acceptable for Grade 2 incombustibility according to both the surface and annexed tests, while the laminates using the conventional surface material become unacceptable for Grade 2 incombustibility according to both the surface and annexed tests.

EXAMPLES 2-4, COMPARATIVE EXAMPLE 4

Laminates having a total thickness of about 25 mm were manufactured in the same manner as described in Example 1 by using the same compounding recipe as shown in Table 2 and the same front surface material as used in Example 1, except that the amount of F-11 was changed so as to change the density of the core material.

In the following Table 4 are shown the amount of F-11, density of the core material and evaluation results relating to Grade 2 incombustibility.

TABLE 4(a)

|  |  | Example 2 | | Example 3 | |
|---|---|---|---|---|---|
| Surface material | Front (thickness) | Aspaal W-3310 (0.27 mm) + Aluminum foil (0.015 mm) | | Aspaal W-3310 (0.27 mm) + Aluminum foil (0.05 mm) | |
|  | Back (thickness) | Aluminum foil (0.05 mm) | | Aluminum foil (0.05 mm) | |
| JIS-A-1321 combustion test | Amount of F-11 (PHI) | 30 | | 26 | |
|  | Class | Surface test | Annexed test | Surface test | Annexed test |
|  | Density of core material (g/cm$^3$) | 0.0257 | 0.0261 | 0.0331 | 0.0322 |
|  | Heat release value (°C. × min.) | 0 | 0 | 0 | 40 |
|  | Fuming factor | 1.4 | 28 | 2.1 | 33.3 |
|  | Time of lingering flame (sec.) | 0 | 29 | 10 | 35 |
|  | Crack/deformation | none/small-middle | — | none/small-middle | — |
|  | Judgement | acceptable | | acceptable | |

TABLE 4(b)

|  |  | Example 4 | | Comparative Example 4 | |
|---|---|---|---|---|---|
| Surface material | Front (thickness) | Aspaal W-3310 (0.27 mm) + Aluminum foil (0.015 mm) | | Aspaal W-3310 (0.27 mm) + Aluminum foil (0.015 mm) | |
|  | Back (thickness) | Aluminum foil (0.05 mm) | | Aluminum foil (0.05 mm) | |
| JIS-A-1321 combustion test | Amount of F-11 (PHI) | 22 | | 18 | |
|  | Class | Surface test | Annexed test | Surface test | Annexed test |
|  | Density of core | | | | |

TABLE 4(b)-continued

|  | Example 4 |  | Comparative Example 4 |  |
|---|---|---|---|---|
| material (g/cm$^3$) | 0.0388 | 0.0379 | 0.0420 | 0.0418 |
| Heat release value (°C. × min.) | 0 | 42 | 7.5 | 87.5 |
| Fuming factor | 11.7 | 46.2 | 72 | 58.2 |
| Time of lingering flame (sec.) | 12 | 39 | 43 | 44 |
| Crack/deformation | none/small | — | none/small | — |
| Judgement | acceptable |  | unacceptable |  |

Note:
Total thickness of laminate = 25.4–25.7 mm

From the results of Table 4, it can be seen that when the density of the core material is more than 0.04 g/cm$^3$, the resulting laminate becomes unacceptable for Grade 2 incombustibility due to the degradation of the fireproof property.

EXAMPLES 5–7, COMPARATIVE EXAMPLE 5

Laminates having a different total thickness were manufactured in the same manner as described in Example 1 except that the core material of urethane modified polyisocyanurate foam was made from the compounding recipe as shown in the following Table 5 and the thickness of the spacer was changed.

In the following Table 6 are shown the density of the core material, total thickness of the laminate and evaluation results relating to Grade 2 incombustibility.

TABLE 5

| Ingredients | Parts by weight |
|---|---|
| Crude diphenylmethane diisocyanate (44V-20) | 100 |
| PP-2000 | 10.77 |
| Solution of 20 wt. % potassium acetate in dipropylene glycol (AcOK/DPG) | 4.0 |
| Dipropylene glycol | 3.2 |
| 2,4,6-tris(dimethylaminomethyl) phenol[1] | 2.0 |
| L-5340[2] | 1.0 |
| F-11 | 30 |

A urethane modifying ratio for isocyanate group is 0.143.

Note:
[1] made by Sanyo Boeki Co., Ltd.; hereinafter abbreviated as DMP-30.
[2] made by Nippon Uncar Co., Ltd.; organopolysiloxane-polyoxyalkylene copolymer.

TABLE 6(a)

|  |  | Example 5 |  | Example 6 |  |
|---|---|---|---|---|---|
| Surface material | Front (thickness) | Aspaal W-3310 (0.27 mm) + Aluminum foil (0.015 mm) |  | Aspaal W-3310 (0.27 mm) + Aluminum foil (0.015 mm) |  |
|  | Back (thickness) | Aluminum foil (0.05 mm) |  | Aluminum foil (0.05 mm) |  |
| JSI-A-1321 combustion test | Class | Surface test | Annexed test | Surface test | Annexed test |
|  | Total thickness of laminate (mm) | 15.8 | 15.4 | 21.6 | 21.4 |
|  | Density of core material (g/cm$^3$) | 0.0276 | 0.0274 | 0.0268 | 0.0266 |
|  | Heat release value (°C. × min.) | 0 | 0 | 0 | 33.75 |
|  | Fuming factor | 6.0 | 22.8 | 6.0 | 34.5 |
|  | Time of lingering flame (sec.) | 8 | 24 | 0 | 7 |
|  | Crack/deformation | none/small | — | none/small | — |
|  | Judgement | acceptable |  | acceptable |  |

TABLE 6(b)

|  |  | Example 7 |  | Comparative Example 5 |  |
|---|---|---|---|---|---|
| Surface material | Front (thickness) | Aspaal W-3310 (0.27 mm) + Aluminum foil (0.015 mm) |  | Aspaal W-3310 (0.27 mm) + Aluminum foil (0.015 mm) |  |
|  | Back (thickness) | Aluminum foil (0.05 mm) |  | Aluminum foil (0.05 mm) |  |
| JIS-A-1321 combustion test | Class | Surface test | Annexed test | Surface test | Annexed test |
|  | Total thickness of laminate (mm) | 25.0 | 25.2 | 32.0 | 31.4 |
|  | Density of core material (g/cm$^3$) | 0.0264 | 0.0262 | 0.0259 | 0.0260 |
|  | Heat release value (°C. × min.) | 0 | 31.25 | 12.5 | 41.3 |
|  | Fuming factor | 5.4 | 40.2 | 60.9 | 52.4 |
|  | Time of lingering flame (sec.) | 0 | 32 | 48 | 45 |
|  | Crack/deformation | non/small-middle | — | none/small-middle | — |
|  | Judgement | acceptable |  | unacceptable |  |

From the results of Table 6, it can be seen that when the total thickness of the laminate exceeds 30 mm, the fireproof property considerably deteriorates and does not pass Grade 2 incombustibility.

EXAMPLEs 8–11

Laminates having a total thickness of about 25 mm were manufactured in the same manner as described in Example 1 except that the amount of F-11 in the compounding recipe of Example 1 was 26 parts by weight and various asbestos papers lined with the aluminum foil of 0.015 mm thickness were used as the front surface material.

In the following Table 7 are shown the surface material used, density of core material and evaluation results relating to Grade 2 incombustibility.

Example 1 by using the compounding recipe of Table 5, except that the amount of F-11 was 26 parts by weight and the thickness of the aluminum foil used for lining the asbestos paper was changed.

In the following Table 8 are shown the lining material used, the density of core material and evaluation results relating to Grade 2 incombustibility.

For the comparison, the fireproof property of the

TABLE 7(a)

|  |  | Example 8 | | Example 9 | |
|---|---|---|---|---|---|
| Surface material | Front (thickness) | Aspaal W-1100[1] (0.35 mm) + Aluminum foil (0.015 mm) | | Aspaal W-3310 (0.27 mm) + Aluminum foil (0.015 mm) | |
|  | Back (thickness) | Aluminum foil (0.05 mm) | | Aluminum foil (0.05 mm) | |
| JIS-A-1321 combustion test | Class | Surface test | Annexed test | Surface test | Annexed test |
|  | Density of core material (g/cm$^3$) | 0.0311 | 0.0306 | 0.0295 | 0.0308 |
|  | Heat release value (°C. × min.) | 0 | 40 | 0 | 37.5 |
|  | Fuming factor | 25.3 | 32.4 | 6.9 | 31.5 |
|  | Time of lingering flame (sec.) | 23 | 19 | 0 | 18 |
|  | Crack/deformation | none/small | — | none/small | — |
|  | Judgement | acceptable | | acceptable | |

Note:
[1] asbestos paper made by Jujo Seishi Co., Ltd.
Total thickness of laminate: 25.0–26.0 mm

TABLE 7(b)

|  |  | Example 10 | | Example 11 | |
|---|---|---|---|---|---|
| Surface material | Front (thickness) | Aspaal M-2282[2] (0.2 mm) + Aluminum foil (0.015 mm) | | Aspaal M-2282 (0.15 mm) + Aluminum foil (0.015 mm) | |
|  | Back (thickness) | Aluminum foil (0.05 mm) | | Aluminum foil (0.05 mm) | |
| JIS-A-1321 combustion test | Class | Surface test | Annexed test | Surface test | Annexed test |
|  | Density of core material (g/cm$^3$) | 0.0304 | 0.0309 | 0.0301 | 0.0312 |
|  | Heat release value (°C. × min.) | 23.75 | 37.5 | 25.0 | 42 |
|  | Fuming factor | 51.6 | 33.9 | 49.8 | 37.9 |
|  | Time of lingering flame (sec.) | 28 | 25 | 20 | 22 |
|  | Crack/deformation | none/small-middle | — | none/small-middle | — |
|  | Judgement | acceptable | | acceptable | |

Note:
[2] asbestos paper made by Jujo Seishi Co., Ltd.
Total thickness of laminate: 25.0–26.0 mm

EXAMPLES 12–13, COMPARATIVE EXAMPLE 6

Laminates having a total thickness of about 25 mm were manufactured in the same manner as described in Example 1 by using the compounding recipe of Table 5, laminate using only Aspaal W-3310 (thickness:0.27 mm) as the front surface material is also shown in Table 8.

TABLE 8

|  |  | Example 12 | | Example 133 | | Comparative Example 6 | |
|---|---|---|---|---|---|---|---|
| Surface material | Front asbestos paper (thickness) | W-3310 (0.27 mm) | | W-3310 (0.27 mm) | | W-3310 (0.27 mm) | |
|  | Lining material (thickness) | Aluminum foil (0.007 mm) | | Aluminum foil (0.05 mm) | | — | |
|  | Back (thickness) | Aluminum foil (0.05 mm) | | Aluminum foil (0.05 mm) | | Aluminum foil (0.05 mm) | |
| JIS-A-1321 combustion test | Class | Surface test | Annexed test | Surface test | Annexed test | Surface test | Annexed test |
|  | Density of core material (g/cm$^3$) | 0.0277 | 0.0275 | 0.0269 | 0.0277 | 0.0278 | — |
|  | Heat release value (°C. × min.) | 0 | 18.75 | 0 | 8.75 | 15.0 | not measured |
|  | Fuming factor | 35.4 | 48.0 | 9.6 | 42.6 | 79.5 |  |
|  | Time of lingering flame (sec.) | 24 | 23 | 17 | 21 | 34 |  |
|  | Crack/deformation | none/small | — | none/small | — | none/small-middle | — |

TABLE 8-continued

|  | Example 12 | Example 13 | Comparative Example 6 |
|---|---|---|---|
| Judgement | acceptable | acceptable | unacceptable |

Note)
Total thickness of laminate: 25.3–26.5 mm

EXAMPLES 14–16, COMPARATIVE EXAMPLE 7

Laminates having a total thickness of about 25 mm were manufactured in the same manner as described in Example 1 except that the core material of urethane modified polyisocyanurate foam was made from the compounding recipe as shown in the following Table 9, the thickness of the back surface material was changed and the heating temperature of the mold was about 60° C.

TABLE 9

| Ingredients | Parts by weight |
|---|---|
| Crude diphenylmethane diisocyanate (44V-20) | 100 |
| PP-2000 | 7.57 |
| Solution of 33 wt.% potassium acetate in diethylene glycol[1] | 7.2 |
| Diethylene glycol | 8.8 |
| 2,4,6-tris(dimethylaminomethyl) phenol | 0.5 |
| L-5340 | 1.0 |
| F-11 | 25 |

A urethane modifying ratio for isocyanate group is 0.254.

Note:
[1] The solution is abbreviated as AcOK/DEG hereinafter.

TABLE 10(a)

|  |  | Example 14 | | Example 15 | |
|---|---|---|---|---|---|
| Surface material | Front (thickness) | Aspaal W-3310 (0.27 mm) + Aluminum foil (0.015 mm) | | Aspaal W-3310 (0.27 mm) + Aluminum foil (0.015 mm) | |
|  | Back (thickness) | Aluminum foil (0.015 mm) | | Aluminum foil (0.05 mm) | |
| JIS-A-1321 combustion test | Class | Surface test | Annexed test | Surface test | Annexed test |
|  | Density of core material (g/cm³) | 0.0277 | 0.0281 | 0.0277 | 0.0277 |
|  | Heat release value (°C. × min.) | 11.25 | 0 | 0 | 0 |
|  | Fuming factor | 57.6 | 31.2 | 2.1 | 29.4 |
|  | Time of lingering flame (sec.) | 25 | 30 | 0 | 32 |
|  | Crack/deformation | none/small | — | none/small | — |
|  | Judgement | acceptable | | acceptable | |

Note
Total thickness of laminate: 25.0–25.4 mm

TABLE 10(b)

|  |  | Example 16 | | Comparative Example 7 | |
|---|---|---|---|---|---|
| Surface material | Front (thickness) | Aspaal W-3310 (0.27 mm) + Aluminum foil (0.015 mm) | | Aspaal W-3310 (0.27 mm) + Aluminum foil (0.015 mm) | |
|  | Back (thickness) | Aluminum foil (0.1 mm) | | Aluminum foil (0.15 mm) | |
| JIS-A-1321 combustion test | Class | Surface test | Annexed test | Surface test | Annexed test |
|  | Density of core material (g/cm³) | 0.0285 | 0.0282 | 0.0278 | 0.0280 |
|  | Heat release value (°C. × min.) | 0 | 0 | 23.75 | 1.25 |
|  | Fuming factor | 55.8 | 37.5 | 48.75 | 33.3 |
|  | Time of lingering flame (sec.) | 22 | 20 | 43 | 21 |
|  | Crack/deformation | none/small | — | none/small | — |
|  | Judgement | acceptable | | unacceptable | |

Note
Total thickness of laminate: 25.0–25.4 mm

In the following Table 10 are shown the front and back surface materials used, the density of the core material and evaluation results relating to Grade 2 incombustibility.

EXAMPLES 17–26

Laminates were manufactured in the same manner as described in Example 1 except that the core material of urethane modified polyisocyanurate foam was made from the compounding recipe as shown in the following Tables 11 and 12.

In Tables 11 and 12 are shown the compounding recipe of the core material, urethane modifying ratio for isocyanate group, density of core material, total thickness of laminate and evaluation results relating to Grade 2 incombustibility.

TABLE 11(a)

|  | Example 17 | | Example 18 | | Example 19 | |
|---|---|---|---|---|---|---|
| Compounding recipe (part by weight) | 44V-20 | 100 | 44V-20 | 100 | 44V-20 | 100 |
|  | PP-2000 | 13.97 | PP-2000 | 13.97 | PP-2000 | 13.97 |
|  | AcOK/DPG | 4.0 | AcOK/DPG | 4.0 | AcOK/DPG | 4.0 |

TABLE 11(a)-continued

|  |  | Example 17 | | Example 18 | | Example 19 | |
|---|---|---|---|---|---|---|---|
|  |  | P-41 | 0.5 | P-41 | 0.5 | P-41 | 0.5 |
|  |  | SRX-274C[1] | 1.0 | SRX-274C[1] | 1.0 | F-11 | 26 |
|  |  | F-11 | 26 | F-11 | 26 |  |  |
|  |  | (addition of silicone surfactant to the compounding recipe of Example 1) | | (addition of silicone surfactant to the compounding recipe of Example 1) | | (reduction of F-11 amount in Example 1) | |
|  |  | Urethane modifying ratio = 0.083 | | Urethane modifying ratio = 0.083 | | Urethane modifying ratio = 0.083 | |
| JIS-A-1321 combustion test | Class | Surface test | Annexed test | Surface test | Annexed test | Surface test | Annexed test |
|  | Total thickness of laminate (mm) | 23.8 | 23.5 | 19.3 | 19.5 | 19.9 | 20.1 |
|  | Density of core material (g/cm³) | 0.0322 | 0.0312 | 0.0330 | 0.0325 | 0.0324 | 0.0326 |
|  | Heat release value (°C. × min.) | 0 | 33.75 | 8.75 | 11.25 | 0 | 8.75 |
|  | Fuming factor | 50.1 | 41.4 | 14.4 | 33.0 | 13.8 | 31.5 |
|  | Time of lingering flame (sec.) | 27 | 39 | 22 | 31 | 15 | 21 |
|  | Crack/deformation | none/small | — | none/small | — | none/small | — |
|  | Judgement | acceptable | | acceptable | | acceptable | |

Note:
[1] made by Nippon Unicar Co., Ltd; organopolysiloxane-polyoxyalkylene copolymer
Front surface material: Aspaal W-3310 (0.27 mm) + Aluminum foil (0.015 mm)
Back surface material: Aluminum foil (0.05 mm)

TABLE 11(b)

|  |  | Example 20 | | Example 21 | |
|---|---|---|---|---|---|
| Compounding recipe (part by weight) |  | 44V-20 | 100 | 44V-20 | 100 |
|  |  | PP-2000 | 7.57 | PP-2000 | 7.57 |
|  |  | dipropylene glycol | 8.0 | dipropylene glycol | 8.0 |
|  |  | AcOK/DPG | 2.0 | AcOK/DPG | 2.0 |
|  |  | DMP-30 | 0.5 | DMP-30 | 1.0 |
|  |  | L-5340 | 1.0 | L-5430 | 1.0 |
|  |  | F-11 | 26 | F-11 | 26 |
|  |  | (variation of modifying agent) | | (change of DMP-30 amount in Example 20) | |
|  |  | urethane modifying ratio = 0.204 | | urethane modifying ratio = 0.204 | |
| JIS-A-1321 combustion test | Class | Surface test | Annexed test | Surface test | Annexed test |
|  | Total thickness of laminate (mm) | 24.0 | 24.4 | 24.4 | 24.7 |
|  | Density of core material (g/cm³) | 0.0324 | 0.0321 | 0.0310 | 0.0319 |
|  | Heat release value (°C. × min.) | 0 | 3.75 | 0 | 10 |
|  | Fuming factor | 26.7 | 36.3 | 18.0 | 34.2 |
|  | Time of lingering flame (sec.) | 7 | 13 | 20 | 31 |
|  | Crack/deformation | none/small | — | none/small | — |
|  | Judgement | acceptable | | acceptable | |

Note:
Front surface material: Aspaal W-3310 (0.27 mm) + Aluminum foil (0.015 mm)
Back surface material: Aluminum foil (0.05 mm)

TABLE 12(a)

|  |  | Example 22 | | Example 23 | | Example 24 | |
|---|---|---|---|---|---|---|---|
| Compounding recipe (part by weight) |  | 44V-20 | 100 | 44V-20 | 100 | 44V-20 | 100 |
|  |  | PP-2000 | 10.77 | PP-400[1] | 10.03 | PP-400 | 10.03 |
|  |  | dipropylene glycol | 4.8 | G-300[2] | 2.77 | G-300 | 2.77 |
|  |  | AcOK/DPG | 2.0 | AcOK/DEG | 2.4 | AcOK/DEG | 2.4 |
|  |  | DMP-30 | 0.5 | N,N-dimethyl-ethanolamine | 0.5 | N,N-dimethyl-ethanolamine | 0.5 |
|  |  | L-5340 | 1.0 | F-11 | 26 | SH-193[3] | 1.0 |
|  |  | F-11 | 30 | | | F-11 | 26 |
|  |  | (change of catalyst amount in the compounding recipe of Examples 5-7) | | | | | |
|  |  | urethane modifying ratio = 0.143 | | urethane modifying ratio = 0.143 | | urethane modifying ratio = 0.143 | |
| JIS-A-1321 combustion test | Class | Surface test | Annexed test | Surface test | Annexed test | Surface test | Annexed test |
|  | Total thickness | | | | | | |

TABLE 12(a)-continued

|  | Example 22 | | Example 23 | | Example 24 | |
|---|---|---|---|---|---|---|
| of laminate (mm) | 20.5 | 20.5 | 24.3 | 24.5 | 23.7 | 24.1 |
| Density of core material (g/cm³) | 0.0275 | 0.0272 | 0.0330 | 0.0327 | 0.0310 | 0.0315 |
| Heat release value (°C. × min.) | 0 | 0 | 11.25 | 17.5 | 0 | 22.5 |
| Fuming factor | 8.4 | 29.4 | 23.7 | 39.0 | 21.0 | 44.7 |
| Time of lingering flame (sec.) | 0 | 26 | 24 | 35 | 17 | 30 |
| Crack/deformation | none/small | — | none/small | — | none/small | — |
| Judgement | acceptable | | acceptable | | acceptable | |

[1] made by Sanyo Kasei Kogyo Co., Ltd.; polypropylene glycol, hydroxyl equivalent = 200
[2] made by Asahi Denka Kogyo Co., Ltd.; addition polyol product of glycerin with propylene oxide, hydroxyl equivalent = 100
[3] made by Toray Silicone Co., Ltd.; organosiloxanepolyoxyalkylene copolymer
Front surface material: Aspaal W-3310 (0.27 mm) + Aluminum foil (0.015 mm)
Back surface material: Aluminum foil 0.05 mm TABLE 12(b)

| | | Example 25 | | Example 26 | |
|---|---|---|---|---|---|
| Compounding recipe (part by weight) | | 44V-20 | 100 | 44V-20 | 100 |
| | | PP-200[4] | 11.8 | PP-200 | 7.57 |
| | | AcOK/DEG | 2.4 | Diethylene glycol | 4.8 |
| | | N,N-dimethylethanolamine | 0.5 | AcOK/DEG | 2.4 |
| | | SH-193 | 1.0 | DMP-30 | 0.5 |
| | | F-11 | 26 | L-5340 | 1.0 |
| | | | | Fyrol-6[5] | 7.70 |
| | | | | F-11 | 26 |
| | | urethane modifying ratio = 0.2 | | Urethane modifying ratio = 0.263 | |
| JIS-A-1321 combustion test | Class | Surface test | Annexed test | Surface test | Annexed test |
| | Total thickness laminate (mm) | 25.0 | 25.1 | 24.6 | 24.2 |
| | Density of core material (g/cm³) | 0.0277 | 0.0282 | 0.0264 | 0.0264 |
| | Heat release value (°C. × min.) | 0 | 7.5 | 0 | 16.25 |
| | Fuming factor | 6.6 | 31.8 | 3.3 | 48.9 |
| | Time of lingering flame (sec.) | 10 | 25 | 0 | 18 |
| | Crack/deformation | none/small | — | none/small-middle | — |
| | Judgement | acceptable | | acceptable | |

[4] made by Sanyo Kasei Kogyo Co., Ltd.; polypropylene glycol, hydroxyl equivalent = 100
[5] made by Stauffer Chemical Corp.; phosphorus containing polyol, hydroxyl equivalent = 127.5
Front surface material: Aspaal W-3310 (0.27 mm) + Aluminum foil (0.015 mm)
Back surface material: Aluminum foil 0.05 mm

EXAMPLES 27–31

Laminates having a total thickness of about 20 mm were manufactured in the same manner as described in Example 1 by using the compounding recipe of Table 5, except that the front surface material of Aspaal W-3310 (0.27 mm thickness) lined with aluminum foil of 0.015 mm thickness was subjected to various surface treatments.

In the following Table 13 are shown the matter of the surface treatment, density of core material and evaluation results relating to Grade 2 incombustibility.

TABLE 13(a)

| | | Example 27 | | Example 28 | | Example 29 | |
|---|---|---|---|---|---|---|---|
| Surface treatment | | Acrylic resin coating[1] (beige) : spraying | | Acrylic resin coating (beige) : spraying | | Acrylic resin coating (beige) : spraying | |
| Thickness of coating (μ) | | 10.5 | | 20.9 | | 30.8 | |
| JIS-A-1321 combustion test | Class | Surface test | Annexed test | Surface test | Annexed test | Surface test | Annexed test |
| | Density of core material (g/cm³) | 0.0273 | 0.0279 | 0.0280 | 0.0281 | 0.0273 | 0.0281 |
| | Heat release value (°C. × min.) | 0 | 10 | 0 | 18.75 | 0 | 28.75 |
| | Fuming factor | 1.8 | 35.1 | 4.5 | 36.3 | 2.4 | 40.5 |
| | Time of lingering flame (sec.) | 0 | 20 | 0 | 17 | 10 | 3 |
| | Crack/deformation | none/small | — | none/small | — | none/small | — |
| | Judgement | acceptable | | acceptable | | acceptable | |

Note:
[1] made by Rock Paint Corp., trade name Air Rock
Total thickness of laminate: 20.5–21.4 mm TABLE 13(b)

|  |  | Example 30 | | Example 31 | |
|---|---|---|---|---|---|
| Surface treatment | | Acrylic resin coating[2](clear) (spraying) + phenolic resin[3] (printing) | | Acryl-urethane resin[4] (grainy printing) + butyral resin[5] (printing) | |
| Thickness of coating ($\mu$) | | 7.1 + 3.0 | | 6.0 + 6.2 | |
| JIS-A-1321 combustion test | Class | Surface test | Annexed test | Surface test | Annexed test |
| | Density of core material (g/cm$^3$) | 0.0271 | 0.0274 | 0.0275 | 0.0267 |
| | Heat release value (°C. × min.) | 0 | 15.75 | 0 | 11.25 |
| | Fuming factor | 4.8 | 30.6 | 2.1 | 33.3 |
| | Time of lingering flame (sec.) | 6 | 29 | 0 | 31 |
| | Crack/deformation | none/small | — | none/small | — |
| | Judgement | | acceptable | | acceptable |

Note:
[2]made by Rock Paint Corp., trade name Air Rock
[3]made by Toyo Ink Co., Ltd.
[4]made by Dainichi Seika Co., Ltd.
[5]made by Dainichi Seika Co., Ltd.
Total thickness of laminate: 20.5–21.4 mm From the results of Table 13, it can be seen that the laminates according to the invention have the fireproof property of Grade 2 incombustibility even when the front surface material is subjected to the surface treatment.

EXAMPLES 32–37

Laminates, wherein the matted or woven fiber was lain near the interface between the core material and the front surface material, were manufactured using the compounding recipe of Table 1 as follows:

In an aluminum mold of 40 cm of length and width each were placed a surface material having approximately the same size as that of the mold and a matted or woven fiber cut at the same size, and then the mold was heated up to about 38° C. in an oven. Separately, 300 g of the crude diphenylmethane diisocyanate was weighed in a stainless beaker of 0.5 l capacity, while the ingredients other than the above diisocyanate were weighed in a polyethylene beaker of 1 l capacity and thoroughly mixed to form a homogeneous solution. To this solution was added the above diisocyanate and then the resulting mixture was immediately stirred at a high speed for about 6 seconds to obtain a foam forming composition. Then, the composition was cast into the aluminum mold disposing the surface material therein. (In this case, two molds were provided and the composition was sequentially cast into these two molds.) Thereafter, an upper aluminum cover having another surface material at its inner surface was placed on the mold through a spacer of 25 mm thickness and fixed thereto by means of clamp or the like. This assembly was heated in an oven at a temperature of about 50° C. for 15 minutes to effect the curing and then the resulting laminate was taken out from the assembly.

In the following Table 14 are shown the surface materials and fiber used, density of core material and evaluation results relating to Grade 2 incombustibility.

TABLE 14(a)

|  |  | Example 32 | | Example 33 | |
|---|---|---|---|---|---|
| Surface material | Front (thickness) | Aspaal W-3310 (0.27 mm) + Aluminum foil (0.015 mm) | | Aspaal W-3310 (0.27 mm) + Aluminum foil (0.015 mm) | |
| | Back (thickness) | Aluminum foil (0.05 mm) | | Aluminum foil (0.05 mm) | |
| Matted or woven fiber (thickness) | | Chopped Strand Mat EMG-450[1] (0.8 mm) | | Roving Cloth EWR-33[2] (0.4 mm) | |
| JIS-A-1321 combustion test | Class | Surface test | Annexed test | Surface test | Annexed test |
| | Density of core material (g/cm$^3$) | 0.0376 | 0.0346 | 0.0314 | 0.0336 |
| | Heat release value (°C. × min.) | 52.5 | 48.75 | 0 | 36.25 |
| | Fuming factor | 9.9 | 52 | 6.3 | 47.4 |
| | Time of lingering flame (sec.) | 20 | 28 | 24 | 22 |
| | Crack/deformation | none/small | — | none/small | — |
| | Judgement | | acceptable | | acceptable |

Note:
[1]made by Nippon Gaishi Seni Co., Ltd.
[2]made by Nippon Gaishi Seni Co., Ltd.
Total thickness of laminate: 24.1–24.8 mm TABLE 14(b)

|  |  | Example 34 | Example 35 |
|---|---|---|---|
| Surface material | Front (thickness) | Aspaal W-3310 (0.27 mm) + Aluminum foil (0.015 mm) | Aspaal W-3310 (0.27 mm) + Aluminum foil (0.015 mm) |
| | Back (thickness) | Aluminum foil (0.05 mm) | Aluminum foil (0.05 mm) |
| Matted or woven fiber | | Surface Mat CFG-08[3] | Surface Mat SM-3600[4] |

TABLE 14(b)-continued

|  |  | Example 34 | | Example 35 | |
|---|---|---|---|---|---|
| (thickness) |  | (0.1 mm) | | (0.2 mm) | |
|  |  | Surface test | Annexed test | Surface test | Annexed test |
| JIS-A-1321 combustion test | Class Density of core material (g/cm$^3$) | 0.0280 | 0.0287 | 0.0301 | 0.0288 |
|  | Heat release value (°C. × min.) | 0 | 35.75 | 0 | 30.25 |
|  | Fuming factor | 3.9 | 40.5 | 2.4 | 44.1 |
|  | Time of lingering flame (sec.) | 13 | 34 | 0 | 12 |
|  | Crack/deformation | none/small | — | none/small | — |
|  | Judgement | acceptable | | acceptable | |

Note:
[3] made by Nippon Gaishi Seni Co., Ltd.
[4] made by Nittobo Co., Ltd.
Total thickness of laminate: 24.1–24.8 mm

TABLE 14(c)

|  |  | Example 36 | | Example 37 | |
|---|---|---|---|---|---|
| Surface material | Front (thickness) | Aspaal W-3310 (0.27 mm) + Aluminum foil (0.015 mm) | | Aspaal W-3310 (0.27 mm) + Aluminum foil (0.015 mm) | |
|  | Back (thickness) | Aluminum foil (0.05 mm) | | Aluminum foil (0.05 mm) | |
| Matted or woven fiber (thickness) |  | Victoria lawn (flame proof type) (0.35 mm) | | Glass Paper 5-50[5] (0.4 mm) | |
|  |  | Surface test | Annexed test | Surface test | Annexed test |
| JIS-A-1321 combustion test | Class Density of core material (g/cm$^3$) | 0.0316 | 0.0316 | 0.0361 | 0.0362 |
|  | Heat release value (°C. × min.) | 0 | 72.5 | 0 | 52.75 |
|  | Fuming factor | 13.5 | 37.5 | 11.7 | 48.3 |
|  | Time of lingering flame (sec.) | 26 | 29 | 22 | 15 |
|  | Crack/deformation | none/small | — | none/small | — |
|  | Judgement | acceptable | | acceptable | |

Note:
[5] made by Undernach Co., Ltd.
Total thickness of laminate: 24.1–24.8 mm

The fireproof laminate of Example 33 comprises a front surface material of an asbestos paper 1 lined with an aluminum foil 3 through an adhesive 2, a core material 4 of a urethane modified polyisocyanurate foam, a matted glass fiber 6 lain between the front surface material and the core material, and a back surface material 5 of an aluminum foil as shown in FIG. 2.

From the results of Table 14, it can be seen that the laminates according to the invention have the fireproof property of Grade 2 incombustibility even when the matted or woven fiber is lain between the front surface material and the core material.

EXAMPLES 38–42

Laminates having a total thickness of about 20 mm were manufactured in the same manner as described in Examples 33–37 except that the thickness of the spacer was changed from 25 mm to 20 mm.

In the following Table 15 are shown the surface materials and fiber used, density of core material and evaluation results relating to Grade 2 incombustibility.

TABLE 15(a)

|  |  | Example 38 | | Example 39 | |
|---|---|---|---|---|---|
| Surface material | Front (thickness) | Aspaal W-3310 (0.27 mm) + Aluminum foil (0.015 mm) | | Aspaal W-3310 (0.27 mm) + Aluminum foil (0.015 mm) | |
|  | Back (thickness) | Aluminum foil (0.05 mm) | | Aluminum foil (0.05 mm) | |
| Matted or woven fiber |  | Roving Cloth FWR-33 | | Surface Mat CFG-08 | |
|  |  | Surface test | Annexed test | Annexed test | Annexed test |
| JIS-A-1321 combustion test | Class material (g/cm$^3$) | 0.0316 | 0.0336 | 0.0294 | 0.0290 |
|  | Heat release value (°C. × min.) | 18.75 | 43.75 | 43.75 | 31.25 |
|  | Fuming factor | 9.9 | 46.2 | 12.0 | 37.2 |
|  | Time of lingering flame (sec.) | 19 | 30 | 16 | 15 |
|  | Crack/deformation | none/small | — | none/small | — |
|  | Judgement | acceptable | | acceptable | |

TABLE 15(b)

|  |  | Example 40 | Example 41 |
|---|---|---|---|
| Surface material | Front (thickness) | Aspaal W-3310 (0.27 mm) + Aluminum foil (0.015 mm) | Aspaal W-3310 (0.27 mm) + Aluminum foil (0.015 mm) |
|  | Back (thickness) | Aluminum foil (0.05 mm) | Aluminum foil (0.05 mm) |
| Matted or woven fiber |  |  | Victoria lawn |

TABLE 15(b)-continued

|  |  | Example 40 | | Example 41 | |
|---|---|---|---|---|---|
|  |  | Surface Mat SM-3600 | | (flameproof type) | |
|  |  | Surface test | Annexed test | Surface test | Annexed test |
| JIS-A-1321 combustion test | Class Density of core material (g/cm³) | 0.0334 | 0.0328 | 0.0323 | 0.0329 |
|  | Heat release value (°C. × min.) | 0 | 18.75 | 67.5 | 42.5 |
|  | Fuming factor | 5.1 | 37.5 | 27.6 | 40.2 |
|  | Time of lingering flame (sec.) | 19 | 7 | 26 | 17 |
|  | Crack/deformation | none/small | — | none/small | — |
|  | Judgement | acceptable | | acceptable | |

TABLE 15(c)

|  |  | Example 42 | |
|---|---|---|---|
| Surface material | Front (thickness) | Aspaal W-3310 (0.27 mm) + Aluminum foil (0.015 mm) | |
|  | Back (thickness) | Aluminum foil (0.05 mm) | |
| Matted or woven fiber | | Glass Paper F-50 | |
|  |  | Surface test | Annexed test |
| JIS-A-1321 combustion test | Class Density of core material (g/cm³) | 0.0381 | 0.0370 |
|  | Heat release value (°C. × min.) | 0 | 48.75 |
|  | Fuming factor | 2.1 | 46.2 |
|  | Time of lingering flame (sec.) | 17 | 33 |
|  | Crack/deformation | none/small | — |
|  | Judgement | acceptable | |

Note:
Total thickness of laminate: 18.8–20.6 mm

EXAMPLES 43–44

Laminates having a total thickness of about 25 mm were manufactured in the same manner as described in Example 1 by using the compounding recipe of Table 5, except that the amount of F-11 was 26 parts by weight and an iron foil was used as the lining material instead of the aluminum foil.

In the following Table 16 are shown the surface materials used, density of core material and evaluation results relating to Grade 2 incombustibility.

TABLE 16

|  |  | Example 43 | | Example 44 | |
|---|---|---|---|---|---|
| Surface material | Front (asbestos paper, thickness) | Aspaal W-3310 (0.27 mm) | | Aspaal M-2282 (0.10 mm) | |
|  | Lining material (thickness) | Iron foil (0.035 mm) | | Iron foil (0.035 mm) | |
|  | Back (thickness) | Aluminum foil (0.05 mm) | | Aluminum foil (0.05 mm) | |
|  |  | Surface test | Annexed test | Surface test | Annexed test |
| JIS-A-1321 combustion test | Class Density of core material (g/cm³) | 0.0280 | 0.0282 | 0.0279 | 0.0290 |
|  | Heat release value (°C. × min.) | 0 | 12.5 | 0 | 15.25 |
|  | Fuming factor | 2.4 | 42 | 6.6 | 40 |
|  | Time of lingering flame (sec.) | 0 | 31 | 0 | 24 |
|  | Crack/deformation | none/small | — | none/small | — |
|  | Judgement | acceptable | | acceptable | |

Note:
Total thickness of laminate: 24.1–24.8 mm

What is claimed is:

1. A fireproof laminate comprising a urethane modified polyisocyanurate foam as a single core material and surface materials piled on both sides of the foam, and passing Grade 2 incombustibility according to Japanese Industrial Standard (JIS) A-1321 combustion test, which comprises:

(a) an asbestos paper having a thickness of 0.1 to 0.5 mm lined with a metal foil having a thickness of less than 0.1 mm as a front surface material for said core material, said asbestos paper being united with said core material through said metal foil by self-adhesion of said foam;

(b) an aluminum foil having a thickness of not more than 0.1 mm as a back surface material for said core material;

(c) as said core material, a urethane modified polyisocyanurate with a polyol having a hydroxyl equivalent of 30 to 2,000 in an amount of 0.05 to 0.5 equivalent per isocyanate group of said organic polyisocyanate in the presence of an isocyanate polymerization catalyst selected from the group consisting of alkali metal salts of carboxylic acids having 2 to 12 carbon atoms and combinations with a tertiary amino compound thereof, a blowing agent and, if necessary, other additives, said core material having a density of 0.02–0.04 g/cm³; and (d) said laminate having a total thickness of not more than 30 mm.

2. A fireproof laminate comprising a urethane modified polyisocyanurate foam as a single core material and surface materials piled on both sides of the foam and passing Grade 2 incombustibility according to Japanese Industrial Standard (JIS) A-1321 combustion test, which comprises:

(a) an asbestos paper having a thickness of 0.1 to 0.5 mm lined with a metal foil having a thickness of less than 0.1 mm as a front surface material for said core material, said asbestos paper being united with said core material through said metal foil by self-adhesion of said foam;

(b) a matted or woven glass fiber or victoria lawn near the interface between said core material and said front surface material, said glass fiber or victoria lawn having a thickness of not more than 2 mm;

(c) an aluminum foil having a thickness of not more than 0.1 mm as a back surface material for said core material;

(d) as said core material, a urethane modified polyisocyanurate foam produced by reacting an organic polyisocyanate with a polyol having a hydroxyl equivalent of 30 to 2,000 in an amount of 0.05 to 0.5 equivalent per isocyanate group of said organic polyisocyanate in the presence of an isocyanate polymerization catalyst selected from the group consisting of alkali metal salts of carboxylic acids having 2 to 12 carbon atoms and combinations with a tertiary amino compound thereof, a blowing agent and, if necessary, other additives, said core material having a density of 0.02-0.04 g/cm$^3$; and (e) said laminate having a total thickness of not more than 30 mm.

3. A fireproof laminate as claimed in claim 1 or 2, wherein said metal foil used for the lining of said asbestos paper is an aluminum foil.

4. A fireproof laminate as claimed in claim 1 or 2, wherein said polyol is a compound having two or more hydroxyl groups at its terminal.

5. A fireproof laminate as claimed in claim 1 or 2, wherein said organic polyisocyanate is an aromatic polyisocyanate.

6. A fireproof laminate as claimed in claim 1 or 2, wherein said organic polyisocyanate is a mixture of polymethylene-polyphenyl isocyanates having the following formula

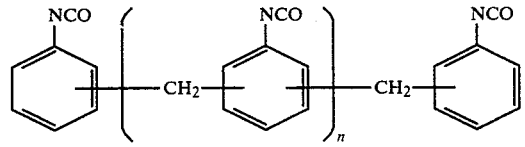

wherein n is 0 or an integer of 1 or more.

7. A fireproof laminate as claimed in claim 1 or 2, wherein said alkali metal salt of carboxylic acid is selected from the group consisting of potassium acetate, potassium 2-ethyl hexanoate, lead 2-ethyl hexanoate, sodium benzoate, potassium naphthenate and potassium caprylate.

8. A fireproof laminate as claimed in claim 1 or 2, wherein said isocyanate polymerization catalyst is used in an amount of 0.5-10% by weight of said organic polyisocyanate.

9. A fireproof laminate as claimed in claim 1 or 2, wherein said blowing agent is a low-boiling inert organic compound.

10. A fireproof laminate as claimed in claim 1 or 2, wherein said blowing agent is trichloromonofluoromethane.

11. A fireproof laminate as claimed in claim 1 or 2, wherein said blowing agent is used in an amount of 10-40% by weight of a foam forming composition.

12. A fireproof laminate as claimed in claim 4, wherein said polyol is selected from the group consisting of a polyhydric alcohol; an addition product of a polyhydric alcohol with an alkylene oxide; an addition product of a polyamine with an alkylene oxide; an addition product of phosphoric acid with an alkylene oxide; an addition product of a phenol with an alkylene oxide; an addition product of an intermediate having a phenolic hydroxyl group with an alkylene oxide; and mixtures thereof.

13. A fireproof laminate as claimed in claim 12, wherein said polyhydric alcohol is selected from the group consisting of ethylene glycol, propylene glycol, butylene glycol, hexalene glycol, diethylene glycol, dipropylene glycol, glycerin, hexanetriol, pentaerythritol, trimethylol propane, methyl glucoside, sorbitol and sucrose, said polyamine is selected from the group consisting of ammonia, ethylene diamine, diethylene triamine and tolylene diamine and said intermediate having a phenolic hydroxyl group is selected from the group consisting of a novolac resin and a resole resin.

14. A fireproof laminate as claimed in claim 1 or 2, wherein said tertiary amino compound is selected from the group consisting of a dialkylaminoalkyl phenol, triethylamine, a N,N',N"-tris(dimethylaminoalkyl)-hexahydrotriazine, a tetraalkylalkylene diamine, dimethylethanol amine, a diazbicyclooctane, and a lower alkyl substituted diazabicyclooctane.

15. A fireproof laminate as claimed in claim 14, wherein said dialkylaminoalkyl phenol is 2,4,6-tris(-dimethylaminomethyl)phenol.

16. A fireproof laminate as claimed in claim 12, wherein said alkylene oxide is ethylene oxide or propylene oxide.

* * * * *